Aug. 21, 1945.  L. HAMMOND  2,383,381
CAMERA SHUTTER
Filed Oct. 28, 1942  2 Sheets-Sheet 1
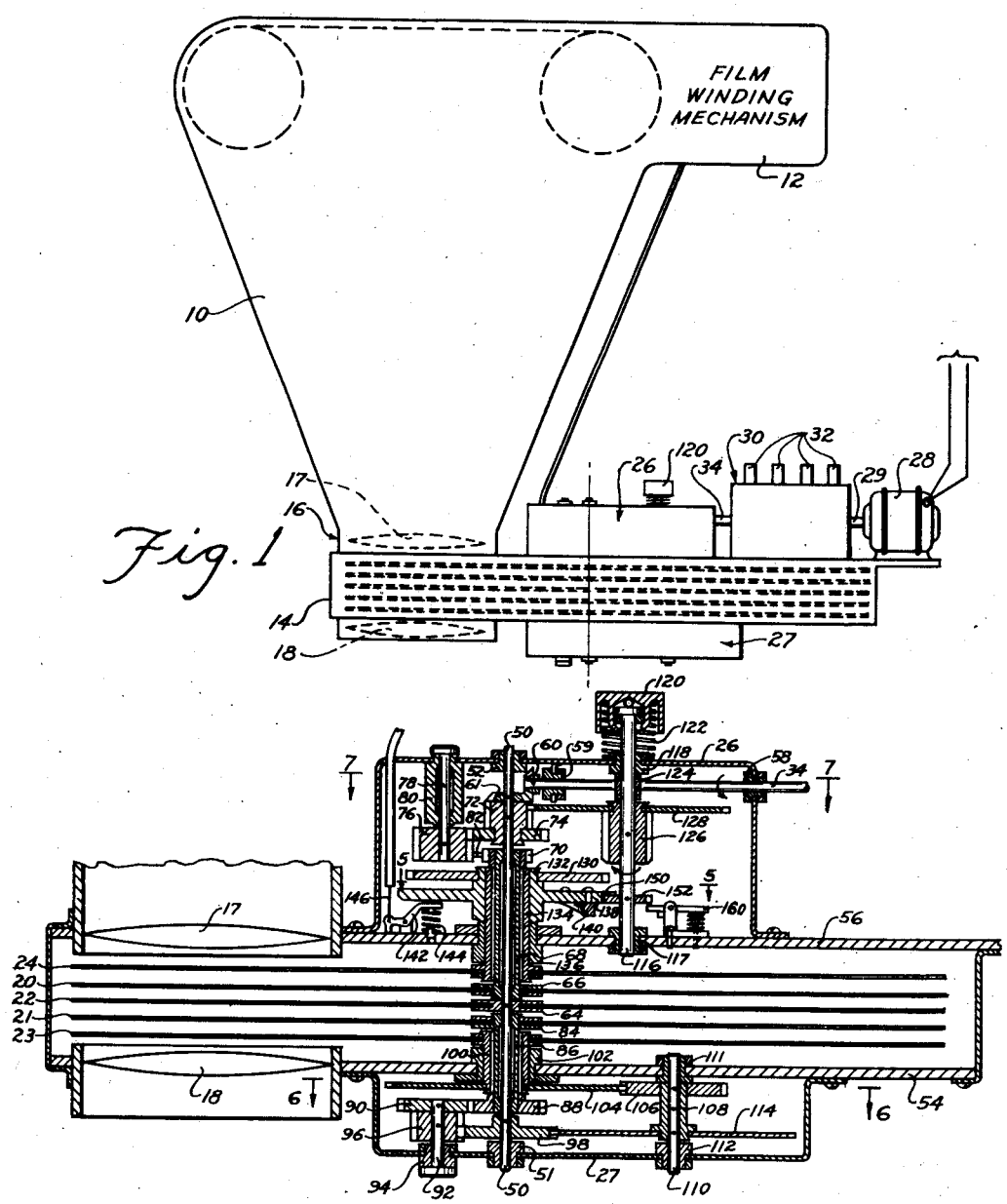
Inventor
Laurens Hammond
By Benjamin J. Nupper
Atty.

Aug. 21, 1945. L. HAMMOND 2,383,381
CAMERA SHUTTER
Filed Oct. 28, 1942 2 Sheets-Sheet 2

Inventor
Laurens Hammond
By Benjamin J. Hupper
Atty.

Patented Aug. 21, 1945

2,383,381

UNITED STATES PATENT OFFICE 2,383,381

CAMERA SHUTTER

Laurens Hammond, Chicago, Ill.

Application October 28, 1942, Serial No. 463,641

7 Claims. (Cl. 95—61)

My invention relates generally to camera shutters, and more particularly to shutter mechanisms for aerial cameras having large lens apertures.

Considerable difficulty has been experienced in adapting shutter mechanisms for aerial and similar cameras having large objective lenses, which may be in the order of 5" in diameter, because of the extremely high acceleration and deceleration of the parts which is required for obtaining short exposures.

It is therefore an object of my invention to provide an improved shutter mechanism for aerial and similar cameras in which the shutter parts are not rapidly accelerated or decelerated but which, nevertheless, may be utilized to obtain exposures as short as $1/300$ to $1/1000$ of a second.

A further object is to provide an improved shutter mechanism for cameras having large objective lenses in which the parts which necessarily move at high speed are continuously rotated.

A further object is to provide an improved shutter mechanism for aerial cameras and the like in which the shutter mechanism may control the operation of the film winding mechanism, whereby the operation of these mechanisms may be synchronized and successive exposures made at short intervals.

A further object is to provide an improved shutter mechanism for aerial cameras and the like which is simple in construction and light in weight, which may be economically manufactured, and which will have a long useful life.

Other objects will appear from the following description, reference being had to the accompanying drawings in which:

Figure 1 is a side elevational view of the improved shutter mechanism applied to an aerial camera which is conventionally illustrated;

Figure 2 is a vertical sectional view of the shutter mechanism taken through the axis of rotation of the shutters and the axis of the trip plunger;

Figure 8:
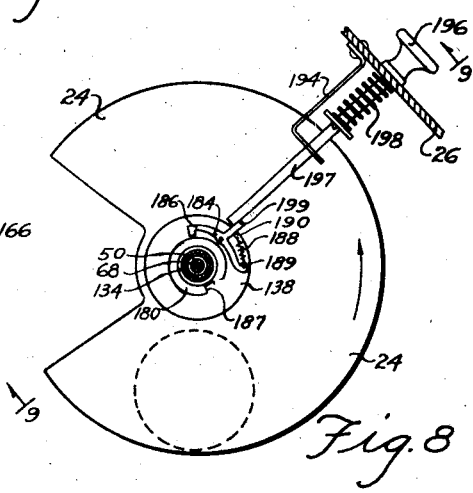
Figure 7:
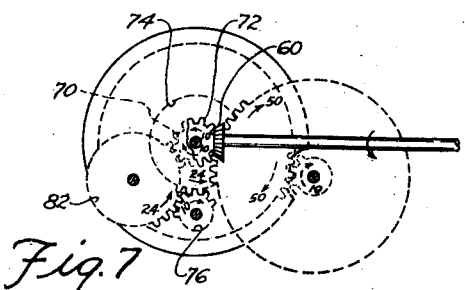
Figure 6:
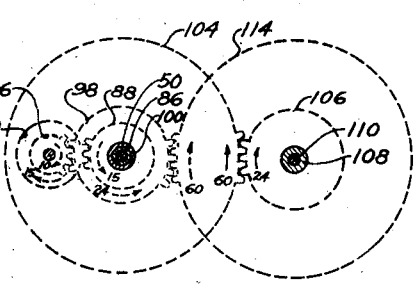
Figure 9:
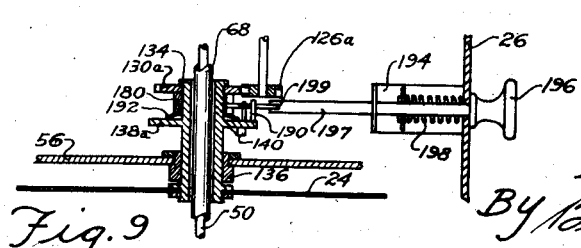

Figures 6 and 7 are fragmentary sectional views of the gear trains taken respectively on the lines 6—6 and 7—7 of Fig. 2;

Figure 8 is a horizontal sectional view of a modified form of shutter trip mechanism; and, Figure 9 is a sectional view taken on the line 9—9 of Fig. 8.

The invention is illustrated as forming part of an aerial camera 10 of any suitable construction, having a film winding mechanism 12 forming a part thereof. The shutters are mounted within a case 14 which intersects the lens casing 16 of the camera so that the shutters pass between lenses 17 and 18.

Five shutters 20, 21, 22, 23 and 24 are mounted for rotation within the case 14, being driven by gearing contained in housings 26 and 27. Power for driving the shutters is obtained from a suitable motor 28 having a drive shaft 29 connected to a variable speed transmission 30, the speed of which may be adjusted by means of suitable controls 32. The gearing within the housing 26 is driven from the variable speed gearing 30 through a drive shaft 34.

Figure 3:
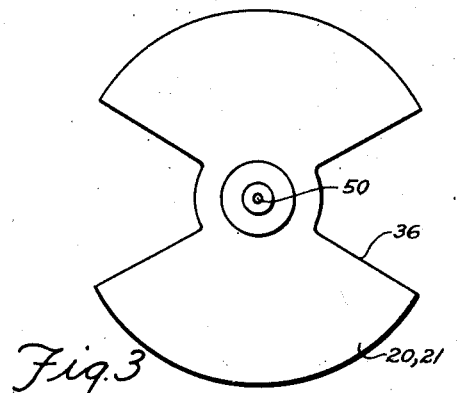
Figure 3 is a plan view of one of the high speed shutters.
Figure 4:
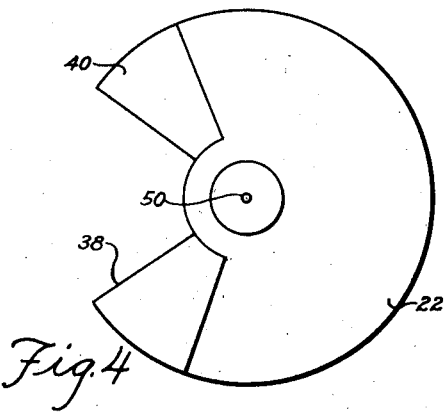
Figure 4 is a plan view of one of an intermediate speed shutter.

The high speed shutter discs 20, 21 may be identical and of the form shown in Fig. 3, wherein it will be seen that these discs have diametrically opposite sector shaped apertures 36. For the embodiment herein described, these apertures 36 may be 60° in angular width, and since the apertures are diametrically opposite, the discs 20, 21 will be in static and dynamic balance.

The disc 22 rotates at intermediate speed and has but one aperture 38, which may be of somewhat greater angular width than the aperture 36, and is illustrated as having an angular width of 72°. The disc 22 is provided with balancing weights 40 which may be in the form of stampings welded to the disc 22 adjacent the aperture 38. In lieu of using one counter weight stamping 40, two similar but thinner stampings may be provided, welded or otherwise suitably secured to the opposite sides of the disc 22. The counter weights 40 are of such mass and shape that the disc 22 is statically and dynamically in balance.

The low speed disc 23 may be identical in shape with the disc 22, but need not be provided with a counter weight, since it operates at a relatively slow speed. The manually controlled disc 24 likewise operates at a slow speed and need not be provided with a balancing weight, being otherwise similar to the disc 22.

The apertures 36 are of such angular width that when either of these apertures is in alignment with the lenses 17, 18, light passage through the latter will be unobstructed.

The general principle of operation of the mechanism is that the discs 20 and 21 rotate at high speed in opposite directions so that twice during each revolution thereof these apertures 26 will be in alignment with the lenses 17, 18, while the disc 22 rotates at an intermediate speed such that its aperture 38 will partially uncover the lenses 17 and 18 only during every fifth time that the apertures 36 are in alignment with the lenses.

The disc 23 rotates at one-fifth of the speed of the disc 22 so that its aperture will be in alignment with the lenses during only every fifth time that the aperture of the disc 22 is in alignment with the lenses. The disc 24 is normally stationary obscuring the lens 17, but when tripped, as will hereinafter appear, it is rotated at a speed one-fifth that of the disc 23. The disc 24 is therefore the slowest speed disc, and since it is manually tripped is also designated herein as a shutter.

As illustrative of the speeds at which the shutter discs may be rotated and the exposure intervals which may be obtained, the discs 20 and 21 may, for example, be rotated in opposite directions at a speed of 3600 R. P. M., the disc 22 rotated at 1500 R. P. M., the disc 23 rotated at 300 R. P. M., and the disc 24, when tripped, at 60 R. P. M. With the shutter discs rotating at these speeds and provided with apertures of the angular dimensions set forth above, the exposure will be 1/300 of a second, and if the tripping mechanism is maintained in shutter release position, successive exposures will be made at one second intervals. Any suitable mechanism may be used to drive the shutter discs, one such mechanism being shown herein.

The disc 22 is suitably secured to a central shaft 50 mounted for rotation in bearings 51 and 52, the bearing 51 being supported in the housing 27 and the bearing 52 being supported in the housing 26. The housing 27 is suitably secured to a generally circular plate 54 forming the bottom of the shutter casing 14, while the housing 26 is secured to an upper plate 56 of the housing 14, this upper plate having suitable extensions for supporting the motor 28.

The drive shaft 34 is supported by a pair of bearings 58 and 59 carried by the housing 26, and at its inner end has a bevel pinion 60 secured thereto and meshing with a bevel gear 61 rigidly secured to the central shaft 50. The disc 22 has a hub 64 which is non-rotatably secured to the shaft 50. (Such parts as are non-rotatable with respect to the shaft upon which they are mounted are indicated as being pinned thereto, although in actual practice other methods of non-rotatably securing these parts to the shaft are utilized.)

The disc 20 has its hub 66 formed integrally with or secured to a sleeve 68 surrounding the shaft 50 and bearing thereon, this sleeve having a pinion 70 secured to its opposite end. As shown in Fig. 7, a pinion 72 is secured to the central shaft 50 and forms the hub for a gear 74. The gear 74 meshes with an idler pinion 76 secured to a stub shaft 78 carried in a bearing 80 which is staked to the wall of the housing 26. The idler pinion 76 meshes with a gear 82 and the latter meshes with the pinion 70. Thus, the shutter disc 20 is driven through the following train of gearing—shaft 34, bevel pinion 60, bevel gear 61, gear 74, idler pinion 76, gear 82, and pinion 70. This is a speed increasing gearing of such ratio that if the shaft 50 rotates at 1500 R. P. M. the disc 20 will rotate at 3600 R. P. M.

The disc 21 has its hub 84 secured to a sleeve 86 bearing on the shaft 50. The sleeve 86 has a gear 88 secured thereto, this gear meshing with a gear 90 secured to a stub shaft 92 rotatable in the bearing 94 secured to the housing 27. Likewise secured to the stub shaft 92 is a pinion 96 which meshes with a gear 98 secured to the central shaft 50. The shutter disc 21 is thus driven through the following gear train—shaft 50, gear 98, pinion 96, gears 90 and 88, and sleeve 86. This gearing is arranged to drive the shutter disc 21 at the same speed as the disc 20, namely, 3600 R. P. M., but in a direction opposite to that in which the disc 20 is driven.

The shutter disc 23 is secured to a sleeve 100 which rotates in a bearing 102 secured to the plate 54 and which, at its outer end, has a gear 104 staked thereto. Gear 104 meshes with a pinion 106 staked to a hub 108 and counter shaft 110. The counter shaft 110 is mounted for free rotation in bearings 111 and 112 secured respectively to the plate 54 and the wall of housing 27. A gear 114 is staked to the hub 108 and meshes with the gear 98. Thus, the disc 23 is driven through the following train of gearing— center shaft 50, gear 98, gear 114, hub 108, pinion 106, gear 104, and sleeve 100. This gearing is so proportioned that the disc 23 will rotate at a speed of 300 R. P. M. assuming that the shaft 50 is rotating at 1500 R. P. M.

A plunger shaft 116 is mounted for rotation and longitudinal sliding movement in bearings 117 and 118, respectively secured to the plate 56 and the wall of housing 26. The upper end of the plunger shaft 116 has a push button 120 rotatably secured thereto. This button is forced outwardly by a compression coil spring 122, such outward movement being limited by the engagement of the collar 124 with the bearing 118. Rigidly secured to the shaft 116 is a pinion 126 having a gear 128 staked thereto. The gear 128 meshes with the pinion 72 at all times, while the pinion 126 is adapted, when the button 120 is depressed, to move the plunger shaft 116 inwardly to engage a gear 130 which is staked to a hub 132, the latter being non-rotatably secured to a sleeve 134. The sleeve 134 is mounted for rotation in a bearing 136 carried by the plate 56 and at its inner end forms the hub for shutter disc 24.

The hub 132 has a cam disc 138 formed integrally therewith or suitably secured thereto, this disc carrying a cam 140, which is adapted to engage a pivoted follower lever 142 which is biased for engagement with the cam 140 by a compression spring 144. The follower lever 142 is connected to a Bowden wire 146 which is adapted to trip the film winding mechanism to cause the latter to wind the film and thereby position the next frame thereof for exposure. The cam disc 138 has a notch 150 formed in the periphery thereof which is adapted freely to receive a locking disc 152 secured to the plunger shaft 116. When the plunger is in the normal position shown in Fig. 2, the disc 152 is in engagement with the notch 150 and thus prevents rotation of the cam disc 138 and all of the parts which are secured thereto, including the shutter disc 24.

When the button 120 is depressed against the force of the spring 122, the locking disc 152 is moved out of the arcuate notch 150 and immediately thereafter the pinion 126 engages the gear 130 to drive the latter. A drive for rotating the shutter disc 24 is thus established through the following train of gearing—center shaft 50, pinion 72, gear 128, pinion 126, gear 130, hub 132, and sleeve 134. This gearing is so arranged that, assuming that the shaft 50 rotates at 1500 R. P.

M., the shutter disc 24 will be rotated at 60 R. P. M.

Figure 5:
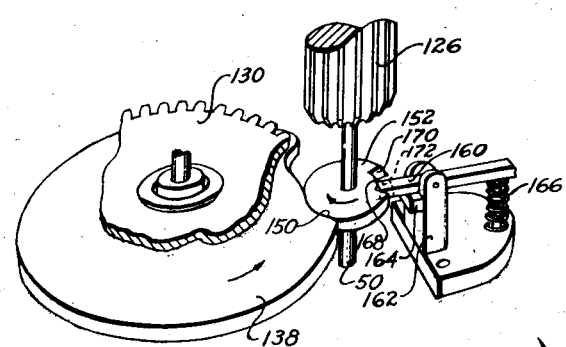
Figure 5 is a perspective view of the shutter release mechanism taken generally on the line 5—5 of Fig. 2.

It is desirable that the pinion 126 engage the gear 130 only when the former is in a predetermined angular position. This is accomplished by providing a movable stop lever 160 which is pivotally mounted upon a suitable support 162 and is prevented from rotating counterclockwise on this support by a lug 164. Clockwise rotation of the lever 160 is permitted against the force of a compression coil spring 166. The disc 152 has a notch 168 which normally passes above the end of the lever 160, one side of this notch being preferably provided with a helical cam face 170 which is cooperable with a complementally shaped cam face 172 formed at the end of the lever 160. By virtue of this arrangement, the pinion 126 will always be in a predetermined orientation the instant it meshes with the gear 130, since it will not be possible to depress the push button 120 until the notch 168 is in line with the end of the lever 160. As soon as this occurs, the disc 152 will move downwardly and such downward movement will be completed by the inter-engagement of the cam surfaces 170 and 172. The end of the lever 160 will thereafter ride along the upper surface of the disc 152 until the notched disc 138 has completed one revolution, whereupon the shaft 50 and all parts carried thereby will move upwardly to the position in which these parts are shown in Figs. 2 and 5, in which position the disc 152 freely clears the end of the lever 160.

The notch 150 in the disc 138 is so positioned relative to the aperture in the disc 24 that shortly after button 120 is depressed and the disc 24 thus engaged with the drive gearing. the aperture in the disc 24 will traverse the lens opening and thus, at the instant the apertures of the other discs are likewise in alignment with the lens openings, expose the film. After the cam disc 138 is rotated through approximately 180°, its cam 140 will engage the follower lever 142 and trip the film winding mechanism 12, thus conditioning the camera for a second exposure. If the button is depressed for but an instant and then released, the locking disc 152 will hold the button depressed, by contacting the lower surface of the cam disc 138 until the latter has completed one revolution, whereupon the spring 122 will snap the button 120 and plunger shaft 116 outwardly to cause the locking disc 152 to re-enter the notch 150 and thus arrest rotation of the shutter disc 24. On the other hand, if the button 120 is held depressed by the finger, the shutter disc 24 will continue to rotate, and exposures will be repeated at one second intervals until the button is released.

The aperture in the disc 24 is of such angular dimensions that one, and only one, exposure will be made during each traverse of the aperture past the lenses.

In Figs. 8 and 9 there is illustrated a modified form of shutter release mechanism. In this modified form the sleeve 134 has a notched plate 180 mounted for rotation thereon, the notched plate being secured to the gear 130a, which is continuously driven by a pinion 126a. A plate 138a is rigidly secured to the sleeve 134 or formed integrally therewith. The plate 138a has a three arm lever 184 pivotally mounted thereon, one arm 186 of this lever having a tooth for engagement with a notch 187 of the notched plate 180. The three arm lever 184 is normally urged to swing counterclockwise (Fig. 8) by a tension coil spring 188 which is tensioned between the end of an arm 189 of the lever 184 and a stop pin 190 projecting from the plate 138a. The plate 138a is frictionally constrained to rotate with the plate 180 by virtue of a frictional connection including a spring washer 192.

A release knob 196 is secured to the end of a release bar 197 which is suitably guided in the casing 26 and a bracket 194, and is normally held in the position shown in Fig. 8 by a compression coil spring 198. The inner end of the release bar 197 is adapted to engage the third arm 199 of the lever 184. The friction afforded by the washers 192 is adequately sufficient to maintain the lever 184 in the position shown in Fig. 8, with the spring 188 under tension.

When it is desired to make an exposure, the knob 196 is pulled outwardly a sufficient distance to release the three arm lever 184 and permit it to swing counterclockwise under the influence of its spring 188. The toothed end of the lever arm 186 will then ride upon the edge of the disc 180 until the notch 187 comes in alignment therewith, whereupon the tooth will fall into the notch and a positive driving connection will be formed between the notched disc 180 and the plate 182. The shutter disc 24 will thus be rotated through at least one revolution to make an exposure. If repeated exposures are desired, the knob 196 is held in its outward position so that the clutching mechanism remains engaged.

Whenever the knob 196 is released, the lever arm 199 will, in the course of its revolution, strike the end of the release bar 197 and thus disengage the toothed arm 186 from the notch 187. The parts will thus be returned to the position in which they are shown in Fig. 8, and will remain in this position until it is desired to make an additional exposure by again pulling out the release knob 196.

The mechanism shown in Figs. 8 and 9 constitutes a one-revolution clutch mechanism and may assume any one of a number of well known forms.

In utilizing the apparatus on an aerial camera, the shutter release knobs 120, 196 may be operated by means of a remotely controlled solenoid or the like, and exposures thus made at the will of the pilot in a fast low-flying single seat airplane. The exposure time may be made so short with the shutter mechanism of the invention that clear photographs may be made under such conditions.

In the foregoing description of the invention reference has been made to certain speeds and dimensions. It will be understood that such references are merely exemplary, and that the apparatus may be made in various sizes and the various parts arranged to operate at speeds, and at speed ratios other than those specified. While I have shown and described particular embodiments of the invention, it will be apparent to those skilled in the art that the invention may be embodied in various forms, all utilizing the underlying principles of the invention. For example, the shutter discs may be arranged to rotate on different axes located in a cluster about the lens axis, instead of being coaxial as shown. I therefore desire, by the following claims, to include within the scope of my invention, all such modifications and variations by which substantially the results of my invention may be obtained through the use of substantially the same or equivalent means.

I claim:

1. In a camera shutter mechanism, the combination of a plurality of apertured discs including a shutter disc, means supporting said discs for rotation with their apertures capable of registration with the lens opening of the camera, gearing for driving said discs at different speeds such that their apertures will register with the lens opening of the camera only once during each revolution of the shutter disc, means normally holding said shutter disc stationary in a position in which it occludes the lens opening, and manually controllable means for releasing said shutter disc and operatively connecting it to said gearing.

2. The combination set forth in claim 1 in which means are provided to prevent release of said shutter disc except when the remaining discs are in predetermined positions.

3. The combination set forth in claim 1, in which a one revolution clutch mechanism is provided for operatively connecting said shutter disc to said gearing.

4. In a camera shutter mechanism, a plurality of adjacent opaque discs including a shutter disc, each disc having an aperture subtended by radii diverging at an acute angle from the centers of the discs, positive drive means for rotating said discs at different speeds such that the optical path for light entering the camera will be cut off by one or several of said discs except when the shutter disc has its aperture in the optical path, means to rotate all of said discs except said shutter disc continuously, manually operated control means for establishing a driving connection between said drive means and the shutter disc, and means for disengaging said driving connection upon completion of one revolution of said shutter disc provided said manually operated control means has been released.

5. In a shutter mechanism for cameras, the combination of a plurality of apertured discs including a shutter disc, said discs being mounted for rotation in a position such that their apertures may register with the lens opening of a camera, gearing driving said discs at different speeds and in predetermined phase relation, with the shutter disc driven at lowest speed, means normally holding said shutter disc stationary with its aperture not registering with the lens opening, and manually controllable means for effecting an operating connection between said gearing and said normally stationary shutter disc to cause the latter to rotate through one revolution in a predetermined phase relation with respect to the other discs.

6. In a shutter mechanism for cameras, the combination of a plurality of opaque discs including a shutter disc, each of said discs having a transparent portion forming an aperture for the camera, driving means for rotating said discs at different speeds and in such phase relation that their apertures will register with the lens opening of the camera only once during the traverse of the aperture of the shutter disc past the lens opening of the camera, said shutter disc rotating at the lowest speed, stop means normally holding said shutter disc stationary in a position in which its aperture is not in registry with the camera lens, and a manually controllable one revolution clutch mechanism including means for rendering said stop means ineffective and connecting said normally stationary shutter disc to said driving means to cause the shutter disc to rotate through one revolution.

7. In a camera shutter mechanism, the combination of five discs including a shutter disc, each disc having an aperture capable of registration with the lens of the camera, motor means and gearing for driving said shutter disc intermittently and the remaining discs continuously, said gearing being operable to rotate said discs at different speeds in predetermined phase relation, with the shutter disc rotating at the lowest speed, a manual control element, means associated with said element normally to hold said shutter disc stationary and effective upon operation of said manual control element to release said shutter disc, and one revolution clutch mechanism controlled by said manual control element and said last named means for rotating said shutter disc through a single revolution in a predetermined phase relationship with respect to the other discs.

LAURENS HAMMOND.